United States Patent [19]
Hollander

[11] 3,971,142
[45] July 27, 1976

[54] SIMULATION APPARATUS

[76] Inventor: James Fisher Hollander, 40 Middlesex St., Matawan, N.J. 07747

[22] Filed: May 23, 1975

[21] Appl. No.: 580,308

[52] U.S. Cl. ............................................ 35/22 R
[51] Int. Cl.² ...................................... G09B 19/00
[58] Field of Search ............ 35/22 R, 24 C, 21, 9 B, 35/9 C

[56] References Cited
UNITED STATES PATENTS 3,748,750   7/1973   Viemeister ......................... 35/22 R

OTHER PUBLICATIONS

"Punish/Reward: Learning With a Critic in Adaptive Threshold Systems," B. Widrow et al., IEEE Transactions On Systems, Man and Cybernetics, vol. SMC–3, No. 5, Sept. 1973, pp. 455–457.

*Primary Examiner*—William H. Grieb

[57] ABSTRACT

Apparatus for simulating decisionmaking in living beings. One or more adjustable voltage sources having knobs indicating levels of decisional influence are connected to a level detecting transistor. The level detector operates a lamp or other display device indicating the decision made in response to the total influence. Personal and judicial decisionmaking are simulated by the disclosed apparatus. One or more variable resistors adjustably isolating the level detector from respective voltage sources have knobs indicating personality factors variably isolating decisionmaking from decisional influences associated with the voltage sources. Apparatus employing a variety of physical principles may be used to accomplish the simulation.

34 Claims, 6 Drawing Figures

SIMULATION APPARATUS

BACKGROUND OF THE INVENTION

The present invention relates to simulation apparatus. More particularly, the present invention relates to apparatus for the simulation of decisionmaking and behavior in living beings such as human beings. The invention can find application in psychology, sociology, law, and the humanities and behavioral sciences in general. Teaching and learning of subject matter related to these areas may be facilitated by the use of the invention. The invention may also be used as a means of self-expression in a clinical setting, and as an educational toy in other contexts.

The background of the invention is here considered in reference to the teaching of psychology. Heretofore, the subject of psychology has commonly been taught orally and with textbooks. Occasionally, diagrams, role-playing simulations, experiments, and computer simulations are used to teach the subject. Because the concepts of psychology can be difficult to grasp, the ability of the student to learn them is taxed. Oral and textbook presentations can be difficult to follow and remember. Diagrams are helpful, but they are essentially static representations which have limited usefulness in representing dynamic psychological phenomena. Role-playing simulations and experiments are also helpful teaching aids, but they can be time-consuming and difficult to organize. Computer simulations are similarly useful but can be time-consuming, expensive, and complicated.

By contrast, the present invention provides simple, self-explanatory apparatus which can be of aid in the teaching of psychology. An inexpensive embodiment of the invention may be used by the teacher in brief demonstrations or used by one or more students in the classroom or laboratory. The apparatus has a dynamic operation and may be manually adjusted, thus facilitating the student's learning and recall.

SUMMARY OF THE INVENTION

In accordance with the present invention one or more adjustable physical influence devices are provided with decisional influence indicators. The total physical influence operates on a level detecting device. Display means operated by the level detecting device indicate a decision.

BRIEF DESCRIPTION OF THE DRAWINGS

The invention will be more readily understood by reference to the appended drawings among which

DETAILED DESCRIPTION OF THE DRAWINGS

Figure 1:
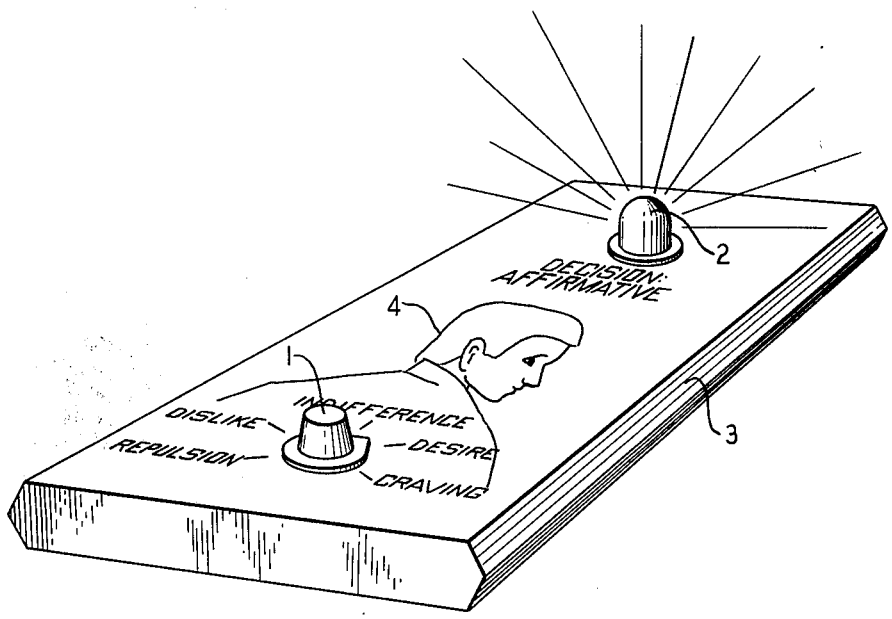
FIG. 1 is a perspective view of the exterior of an embodiment of the invention.

FIG. 1 shows an aid for teaching a psychological principle. A container 3 suitable for holding in the hand is provided. A lamp assembly 2 indicates a decision in the affirmative if the lamp is lighted, and a decision in the negative if the lamp is dark. Lamp assembly 2 makes a decision indication in response to the setting of dial knob 1. The setting of knob 1 indicates a level of emotional influence on the decision. Knob 1 points to markings on the panel of container 3, such as REPULSION, DISLIKE, INDIFFERENCE, DESIRE, and CRAVING.

Figure 4:
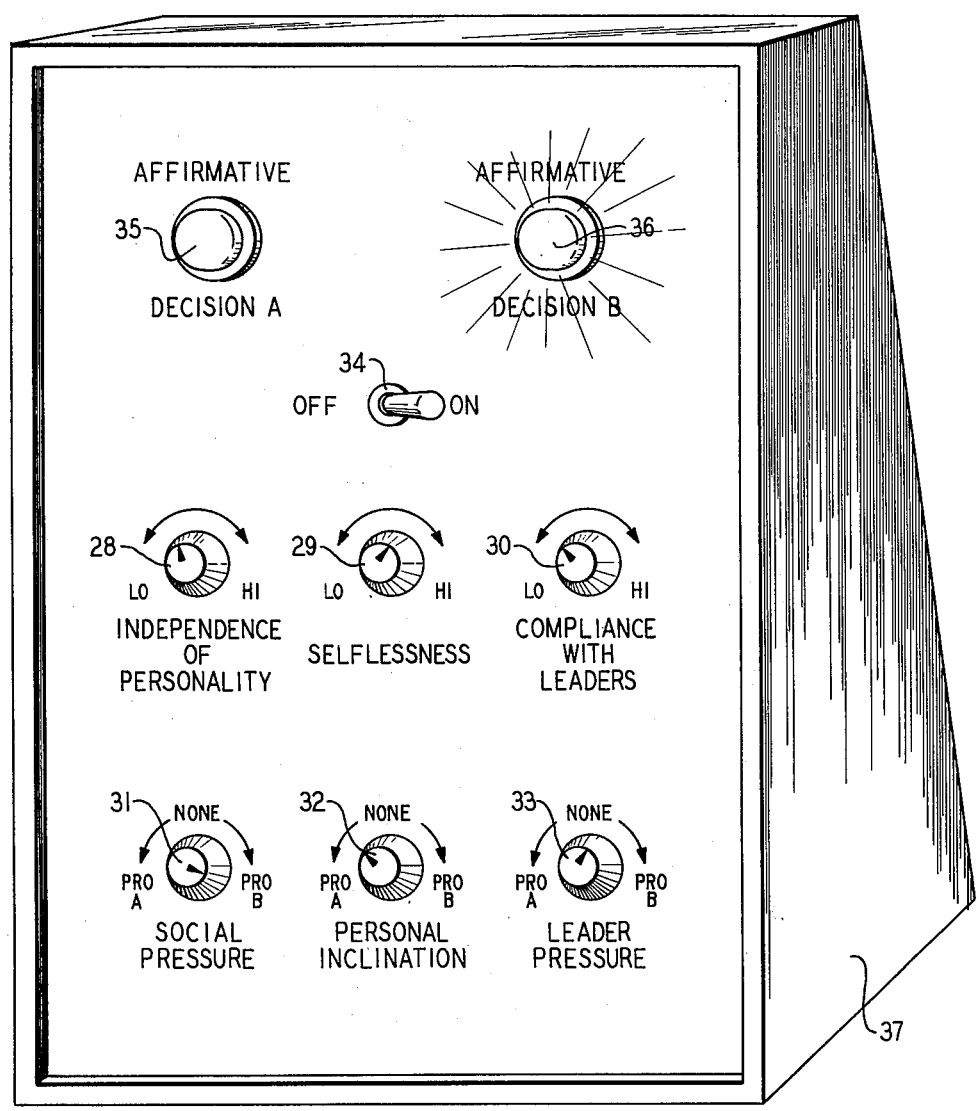
FIG. 4 is a perspective view of the exterior of an embodiment of the invention in which the circuit of FIG. 3 may be used.

The outline of a human figure 4 assists in rapidly conveying a simple psychological principle to the student: namely, that "yes" and "no" decisions are responses corresponding to the emotional state of a human individual and that a threshold exists at which a decision turns on a small change in the level of influence of an emotional state. Decisions are made continually.

Figure 2:
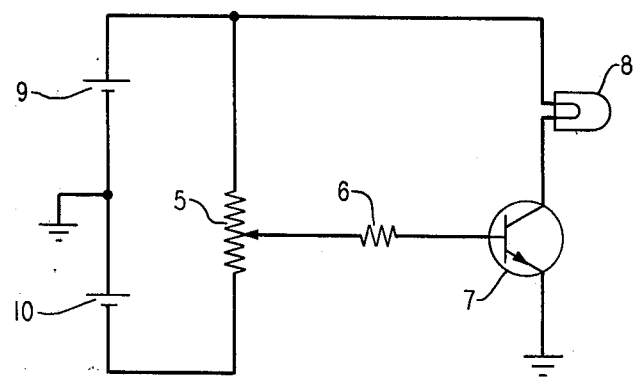
FIG. 2 is a schematic diagram of an electrical system which may be used as a part of the embodiment of FIG. 1.

FIG. 2 shows a schematic diagram of a simple electrical system which may be used as part of the teaching aid of FIG. 1. Two batteries 9 and 10 connected in series and tied to ground supply a positive and negative voltage respectively. A variable resistor potentiometer 5 connected from the positive terminal of battery 9 to the negative terminal of battery 10 is adjustable by the abovementioned knob 1 so that a positive, zero, or negative voltage appears on an adjustable wiper of the potentiometer connected to resistor 6. Resistor 6 is connected to the base of an NPN transistor 7 which has its emitter connected to ground. Resistor 6 acts to limit the current which may flow from the base to the emitter so as to protect the transistor 7 from excessive current flow. A lamp 8, which may be used in the indicator lamp assembly 2 of FIG. 1, is connected from the positive voltage source to the collector of transistor 7.

The resistances of potentiometer 5 and resistor 6 together with the resistance and power requirements of lamp 8 are selected so that when the wiper setting of potentiometer 5 is slightly above zero voltage, transistor 7 conducts sufficient current to turn lamp 8 on. Knob 1 is attached to potentiometer 5 so that the zero voltage potentiometer setting corresponds to the decision threshold knob setting of INDIFFERENCE. When potentiometer element 5 is set for a negative voltage by decreasing the setting of knob 1 below the indifference threshold, transistor 7 conducts negligible current and lamp 8 is dark.

The transistor 7 acts as a level detector so that when the electrical voltage or current influence upon it exceeds a voltage or current threshold level, current flows in the collector circuit path. This electrical influence is analogous to a motivational or decisional influence or stimulus. The electrical current response of the level detector is analogous to a decision, action, belief, or response of a living being. Thus, when lamp 8 is off, a negative decision is indicated. When current flows and lamp 8 is on, a decision in the affirmative is indicated.

Figure 3:
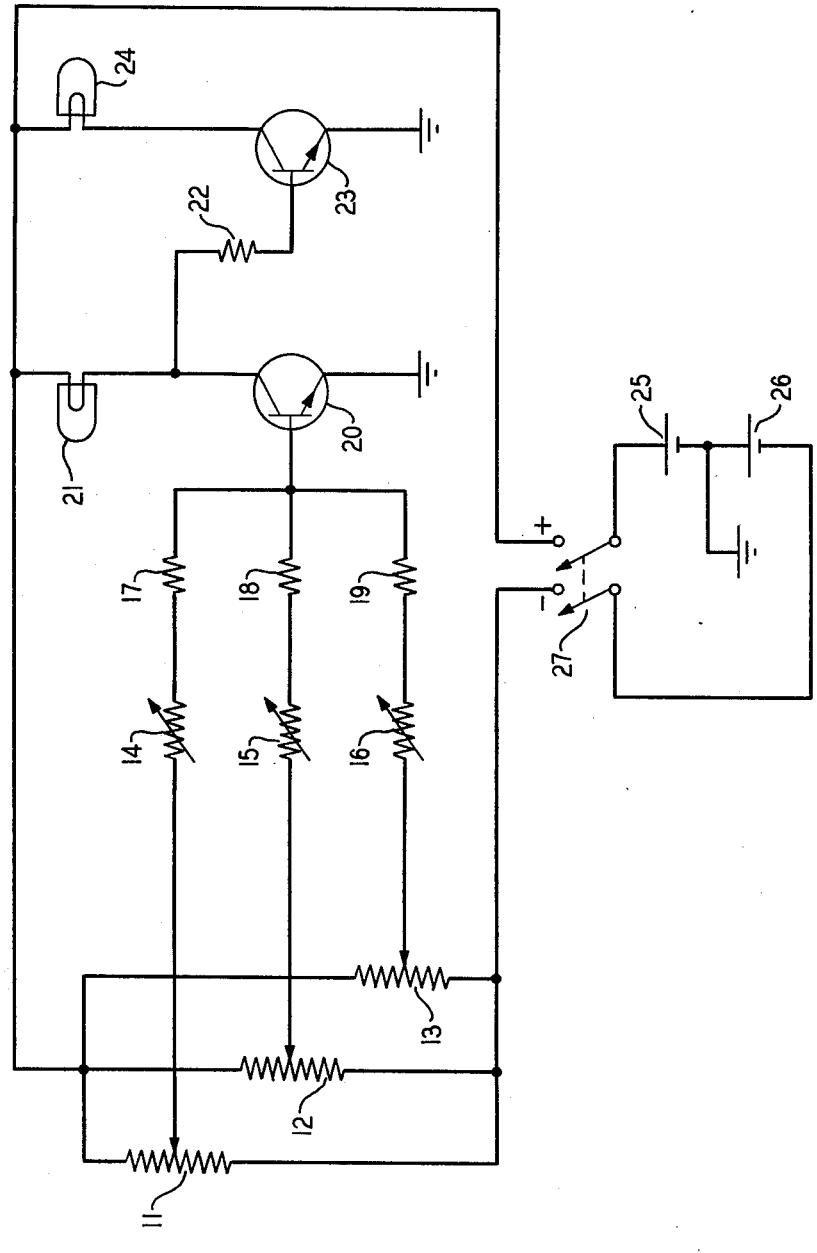
FIG. 3 is a schematic diagram of an electronic device which may be used as part of a more complex embodiment of the invention.

FIG. 3 shows a more elaborate version of the electrical circuit of FIG. 2. Three potentiometers 11, 12, and 13 provide independently adjustable wiper voltages to adjustable resistances 14, 15, and 16. Resistances 17, 18, and 19 provide overcurrent protection to NPN level threshold detecting transistor 20. Lamp 21, connected from the collector of transistor 20 to a positive voltage supply, indicates the response of the level detector.

Resistor 22, transistor 23, and lamp 24 provide a simple inverter circuit designed so that when lamp 21 is off, lamp 24 is on, and vice versa. A change in response of the level detecting transistor 20 is indicated by both lamps 21 and 24 so that one of the lamps 21 or 24 is on all of the time that the apparatus is being used. Series batteries 25 and 26 provide a supply of positive and negative voltage which may be disconnected by tandem switch 27 when the teaching aid is not in use.

Transistor 20 is subject to the combination of three independent electrical voltage and current influences due to the settings of potentiometers 11, 12, and 13. However, transistor 20 may be more or less isolated from these influences by variable resistors 14, 15, and 16. Hence, the settings of potentiometers 11, 12, and 13 may be interpreted as levels of three stimuli or influences on decisionmaking. The settings of variable resistances 14, 15, and 16 may correspondingly be interpreted as levels of isolation or susceptibility of the individual to the decisional influences.

FIG. 4 shows a perspective view of a device for simulating personality into which the electronic circuit of FIG. 3 may be incorporated. The electronic circuit is put inside a housing 37 having a panel with adjustment dials suitably marked so that the circuit may accomplish its simulation or teaching function. Switch 34 corresponding to tandem switch 27 controls the power to the circuit. The simulated individual makes a choice between alternative decisions A and B as indicated by indicator lamp assemblies 35 and 36 holding lamps 24 and 21 respectively. For example, decision A may be in favor of staying home on Saturday night. Decision B may be going to a party that "everybody" is going to on Saturday night.

Knobs 31, 32, and 33 are attached to potentiometers 11, 12, and 13 and are used to adjust them respectively to voltages corresponding to the levels of decisional influence that are being exerted on the individual. A negative voltage setting is "Pro A" and a positive voltage setting is "Pro B". In the context of the abovementioned decision example, the settings of the knobs 31, 32, and 33 shown in FIG. 4 represent a situation in which there is a large amount of social pressure to go to a party because "everyone" is going, but the individual would personally rather stay home in spite of the fact that he was specially asked to come by the host. "Social Pressure" knob 31 is turned completely clockwise to indicate a high degree of social pressure to attend (Decision B). "Personal Inclination" knob 32 is turned halfway counterclockwise to indicate a moderate personal inclination to stay home (Decision A). "Leader Pressure" knob 33 is turned partly clockwise to indicate that the host has given an invitation to attend (Decision B).

Knobs 31, 32, and 33 have settings that represent personal situations that can be changing from moment to moment in the life of the individual. By contrast, knobs 28, 29, and 30 indicate the levels of relatively slowly changing personality characteristics which influence the capacity of the individual to be influenced by the decisional forces acting upon him as represented by the settings of knobs 31, 32, and 33.

Knob 28 of FIG. 4 controls the setting of variable resistor 14 of FIG. 3, which is electrically connected so that clockwise rotation of knob 28 increases the resistance of variable resistor 14. Transistor 20 is thus variably isolated from the electrical influence of the wiper voltage of potentiometer 11. Accordingly, panel markings near knob 28 indicate that the setting of that knob represents "Independence of Personality" from the "Social Pressure" knob setting.

Similarly, knob 29 ("Selflessness") adjusts the isolation of transistor 20 from potentiometer 12 ("Personal Inclination") by setting the resistance of variable resistor 15. Higher "Selflessness" means greater isolation of decisionmaking from "Personal Inclination," so variable resistor 15 is connected so that clockwise rotation of knob 29 increases its resistance.

Knob 30 ("Compliance with Leaders") adjusts the isolation of transistor 20 from potentiometer 13 ("Leader Pressure") by setting the resistance of variable resistor 16. High "Compliance with Leaders" means low isolation of decisionmaking from the influence of "Leader Pressure". Hence, the electrical connections to variable resistor 16 are made in a manner such that full clockwise rotation of knob 30 corresponds to the lowest resistance setting of variable resistor 16, in contrast to the knob action described in connection with knobs 28 and 29 and variable resistors 14 and 15 respectively.

The individual simulated with settings of knobs 28, 29, and 30 as shown in FIG. 4 has a personality characterized by a moderate independence of personality, moderately high selflessness, and moderately low compliance with leaders. Thus, in the party attendance decision example suggested hereinabove, this individual's inclination (see knob 32) to stay at home (Decision A) is partly disregarded due to his moderately high selflessness (knob 29). He is persuaded to go to the party (Decision B—indicator 36 turned on) because of the relatively greater combined influence firstly of strong social pressure (knob 31) in view of his moderately low independence of personality (knob 28), and, second, the moderate leader pressure of the hosts's invitation (knob 33) despite his moderately low willingness to comply with leaders (knob 30). Decision indicator 35 is off while indicator 36 is on because Decision a (stay home) is foregone in favor of Decision B (attend party).

The dials of the simulation apparatus of FIG. 4 have threshold levels like the dial of the simulation apparatus of FIG. 1. If, in the example recited above, the party were being hosted by a person who is very unpopular in the community, there would be a social pressure not to attend. To simulate this situation, knob 31 is turned counterclockwise to a setting toward the marking "Pro A" (stay home decision). In the process the decisional influence indication of knob 31 decreases below a threshold level setting in its range so that lamp assembly 35 (Decision A—stay home) lights up and lamp assembly 36 (Decision B—attend party) turns off. However, this threshold point depends on the settings of all of the other knobs. Other threshold levels are also found by adjusting the respective adjustment dials.

The response of the same individual to different situations can be studied in simulation by leaving adjustment dials 28, 29, and 30 at the same settings and adjusting adjustment dials 31, 32, and 33 according to each hypothetical situation. On the other hand, the response of different personalities in a population may be studied in the context of the same situation, such as a voting decision, by leaving the knobs of adjustment dials 31, 32, and 33 at given settings and adjusting the knobs of adjustment dials 28, 29, and 30 to simulate various personalities of people in the population.

Different situational examples in addition to those abovementioned may be analyzed with the apparatus of the present invention. The adjustment dials are given interpretations suitable for each example. Interchangeable printed overlay sheets, flip cards, window indicators or other means may readily be provided for the panel so that the interpretations to be given to each adjustment dial and decision indicator may be varied or made more specific.

It should be understood furthermore that a variety of electrical circuits according to the invention may be used to simulate decisional situations. One or more isolation variable resistors may be incorporated in the circuits. Some or all of a number of voltage-adjusting potentiometers are suitably associated with one or more of the isolation variable resistors. Adjustment dials are provided and appropriately marked to indicated decisional influence or susceptibility factors. On the other hand, a plurality of potentiometers without any isolation variable resistors may be employed with suitable adjustment dials as in the embodiment of my invention described in connection with FIGS. 5 and 6.

Figure 5:
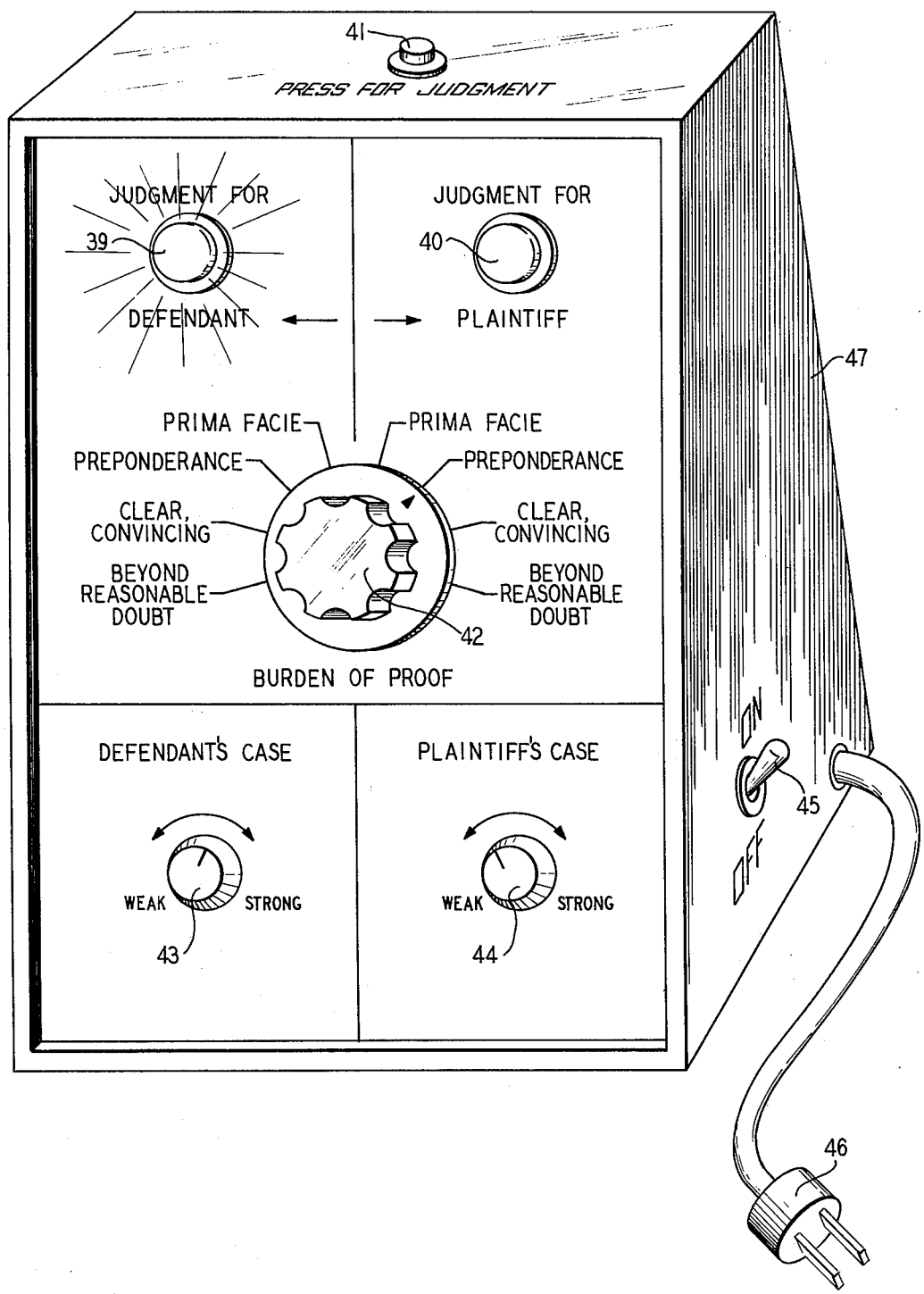
FIG. 5 is a perspective view of an embodiment of the invention useful in illustrating principles of law and judicial decisionmaking.

FIG. 5 shows a perspective of the exterior of an embodiment of the invention for simulating of the decisionmaking of a judge in a law case. The strengths of the plaintiff's and defendant's cases, which are opposing influences on the decision of the court, are indicated by settings of adjustment dials including knobs 43 and 44. The judge must decide the issues of the case in light of a jurisprudential standard for analyzing the evidentiary submissions and legal arguments of the opposing parties. The jurisprudential standard, or burden of proof, is indicated by the adjustment dial including knob 42 which is set to a "Prima Facie," "Preponderance," "Clear and Convincing," or "Beyond a Reasonable Doubt" standard depending on the nature of the case or motion in a case.

The operation of the apparatus of FIG. 5 is better understood by considering its use in simulating a negligence liability tort case. Plug 46 is connected to a source of electrical power and the power is switched on by switch handle 45 which is mounted on container 47. Knob 44 is set to show that plaintiff has presented a moderately persuasive case, considering his evidence in light of the legal theory asserted. In the absence of submissions by the defendant, plaintiff has met his burden of proof (Preponderance of the evidence—see knob 42 setting) and would win judgment in his favor. However, let it be given that defendant has cast doubt on the credibility of plaintiff's witnesses and has introduced witnesses tending to show contributory negligence on the plaintiff's part. Futher, let it be given that the defendant has supported his case with a legal argument that contributory negligence by plaintiff relieves defendant from liability and that this rule is recognized in the jurisdiction in which the court sits. Knob 43 is accordingly set to a "moderately strong" setting.

Pushbutton 41 is pressed to obtain a simulated decision of the court. Decision indicator 39 lights up, indicating "Judgment for Defendant." Decision indicator 40 is dark, indicating that judgment was not rendered in favor of plaintiff. After the judgment has been indicated, pushbutton 41 is released and both decision indicators become dark.

When a counterclaim is to be judged, the burden of proof shifts to the defendant in his case against the plaintiff. For example, in a hypothetical civil case counterclaim, "Burden of Proof" knob 42 is rotated to the "Preponderance" setting on the left or "Defendant" side of the panel in FIG. 5. If it be given that defendant puts forward a moderately strong case for his counterclaim, "Defendant's Case" knob 43 is correspondingly set as indicated in FIG. 5. If it additionally be given that plaintiff's submissions to the court remove any legal basis for the fixing of liability on plaintiff, the "Plaintiff's Case" knob 44 is set fully clockwise to "Strong." Then when "Press for Judgment" pushbutton 41 is pressed, decision indicator 40 lights up indicating "Judgment for Plaintiff."

The apparatus of FIG. 5 may advantageously be used to show how the same law case, as indicated by the settings of knobs 43 and 44, is decided with different burdens of proof. The apparatus may also serve as a teaching aid in the discussion of a wide variety of hypothetical cases and the discussion of jurisprudential concepts generally.

Figure 6:
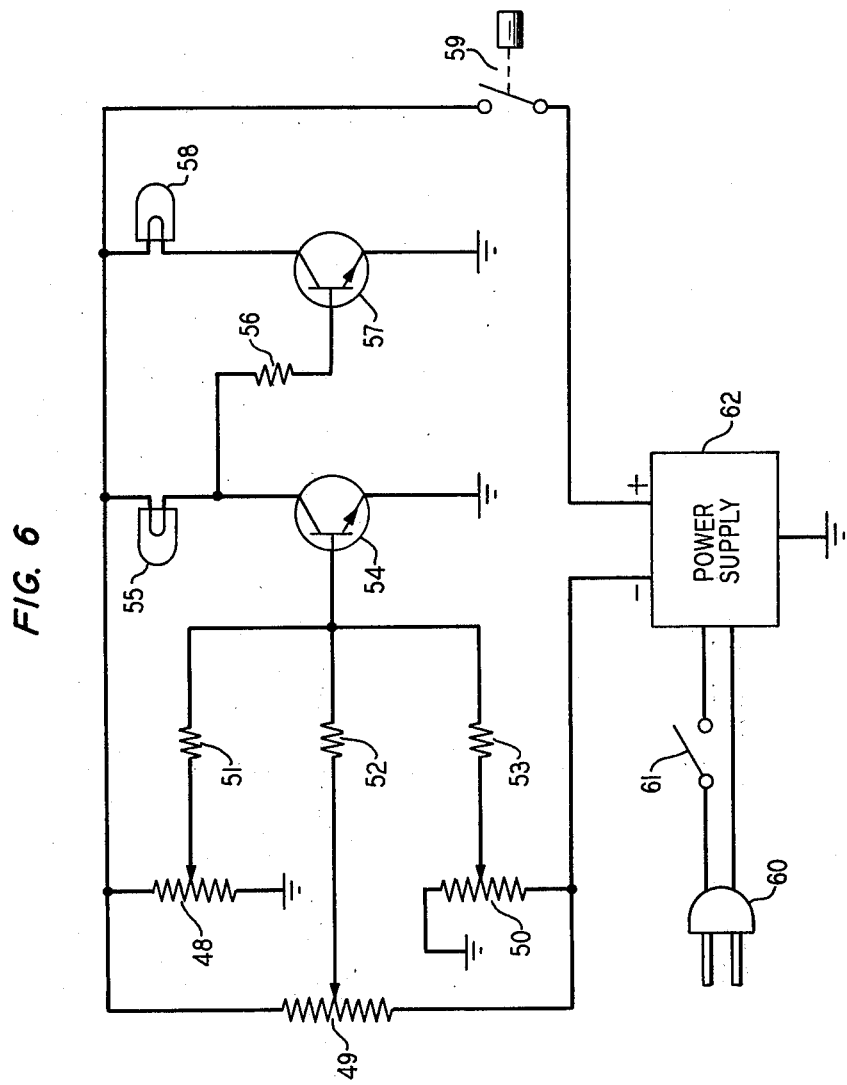
FIG. 6 is a schematic diagram of an electronic circuit which may be used as part of the embodiment of FIG. 5.

FIG. 6 shows an electronic circuit which is suitable for use in the simulator of FIG. 5. A dual polarity power supply 62 is turned on by switch 61 having handle 45 when connector 60 corresponding to plug 46 is connected to a source of external power. Potentiometer 49 attached to knob 42 is used to set the burden of proof. A variable "burden of proof voltage," which is negative when plaintiff bears the burden and positive when defendant bears the burden, is available on the wiper of potentiometer 49. The "Plaintiff's Case" knob 44 is attached to potentiometer 48, which provides a variable wiper voltage of positive polarity only. "Defendant's Case" knob 43 is attached to potentiometer 50 which provides a variable wiper voltage of negative polarity only. Potentiometers 48 and 50 are connected so that the zero voltage setting corresponds to a "Weak Case" setting on the corresponding adjustment dial. Resistances 51, 52, and 53 protect transistor 54 from overcurrents, and resistances 51 and 53 are equal due to an assumed symmetry of the positions of the plaintiff and defendant.

Transistor 54 acts as a level detector in the manner described in connection with FIGS. 2 and 3. If the influence of "plaintiff" potentiometer 48 prevails, a current flows into the base of transistor 54 causing lamp 55 to light when switch 59 having pushbutton 41 is closed. Also, when switch 59 is closed, an inverter circuit consisting of resistor 56, transistor 57, and lamp 58 keeps lamp 58 dark when lamp 55 is lighted and lights lamp 58 when lamp 55 is dark. Lamp 55 is located in decision indicator 40 ("Judgment for Plaintiff") and lamp 58 is included in decision indicator 39 ("Judgment for Defendant").

It should be understood that the apparatus described hereinabove is amenable to many circuit design variations. For instance, a relay and series diode may be used in place of a level detecting transistor in the circuitry. The lamps can be replaced by other types of decision indicators such as meters or display devices emitting light, sound, voice, tactile, or other indications in response to the state of the level detector.

Indeed, the apparatus need not employ electronic circuitry for the accomplishment of its functions. For instance, an arrangement of adjustable cams, rods, and springs may readily be devised for introducing influences in a mechanical system for operating display means in a manner analogous to the level detection of electronic influences in the disclosed apparatus. A variety of decisional influence analogs of an electrical, mechanical, optical, acoustic, general radiant energy, chemical, hydraulic, pneumatic, or other nature may be applied in a physical system associated with a decision indicator in embodiments of my invention.

Thus, it is to be understood that the description of particular embodiments of my invention in this disclosure only suggests and illustrates the broader spirit and scope of the invention.

I claim:

1. Simulation apparatus comprising
   means for indicating and adjustably varying levels of a plurality of decisional influences;
   means for indicating one of a plurality of alternative decisions;
   and physical system means for causing said decision indicator to indicate a first decision when a combined total of said variable levels is above a threshold level and to indicate a different decision when said total is below said threshold level.

2. Simulation apparatus as claimed in claim 1 wherein said physical system means is electrical.

3. Simulation apparatus as claimed in claim 1 wherein said physical system means is an electronic system.

4. Simulation apparatus as claimed in claim 1 wherein said physical system means is an electrical system and said influence indicating means includes a dial knob pointing to markings on a surrounding surface.

5. Simulation apparatus as claimed in claim 1 wherein said physical system means is mechanical.

6. Simulation apparatus as claimed in claim 1 wherein said decision indicator indicates one of a plurality of personal decisions.

7. Simulation apparatus as claimed in claim 1 wherein said decisional influences include a characteristic of personality.

8. Simulation apparatus as claimed in claim 1 wherein said decisional influences include social pressure.

9. Simulation apparatus as claimed in claim 1 wherein said decisional influences include personal desire.

10. Simulation apparatus as claimed in claim 1 wherein said decisional influences include leader pressure.

11. Simulation apparatus as claimed in claim 1 wherein said decision indicator indicates decisions of a public nature.

12. Simulation apparatus as claimed in claim 1 wherein said decision indicator indicates decisions of a judicial nature.

13. Simulation apparatus as claimed in claim 1 wherein said decision indicator indicates one of no more than two decisions.

14. Simulation apparatus as claimed in claim 1 wherein said decision indicator provides a visual indication of a decision.

15. Simulation apparatus as claimed in claim 1 wherein said decision indicator provides a visual indication by emitting light.

16. Simulation apparatus as claimed in claim 1 wherein said decision indicator indicates one decision by emitting light and indicates another decision by appearing dark.

17. Simulation apparatus as claimed in claim 1 wherein said decision indicator provides an audible indication of a decision.

18. Simulation apparatus as claimed in claim 1 wherein said decision indicator provides a voice sound indicating a decision.

19. Simulation apparatus as claimed in claim 1 wherein said decision indicator provides a tactile indication of a decision.

20. A decision simulator comprising
    a plurality of adjustment dials indicating respective levels of different decisional influences;
    an indicator for displaying one of two decisions at a time;
    and device means adjustable by said dials for causing said indicator to display a first decision when the levels indicated on said dials combine to exceed a threshold and to display a second decision when the levels indicated on said dials combine otherwise than to exceed said threshold.

21. A decision simulator as claimed in claim 20 wherein said adjustable device means comprises
    a plurality of adjustable sources of electrical voltage and
    means for combining said electrical voltage from each of said sources and causing said indicator to display a first decision when said voltage so combined exceeds a voltage threshold and to indicate a second decision when said voltage so combined is less than said voltage threshold.

22. A decision simulator as claimed in claim 21 wherein said adjustable sources of electrical voltage are attached each to a respective one of said adjustment dials and said dials respectively indicate a form of social pressure, an influence relating to personal inclination, and a form of leader pressure.

23. A decision simulator as claimed in claim 21 wherein
    said adjustable sources of electrical voltage are attached to said adjustment dials respectively, said adjustment dials respectively indicating influences on judicial decisionmaking;
    and said decision simulator further comprises switch means for enabling said decision indicator to display a judicial decision only when desired.

24. A decision simulator as claimed in claim 21 wherein each of said adjustable sources of electrical voltage comprises
    a source of fixed voltage having a positive point, a negative point, and a ground point; and
    a variable resistor potentiometer connected across said positive and negative points and having a wiper adjustable therebetween so that a variable voltage appears between said wiper and said ground point;
    said combining means being connected to each said wiper and ground point.

25. A decision simulator as claimed in claim 24 wherein
    said combining means comprises isolation resistances, connected to each said wiper respectively, and a transistor having a base, an emitter, and a collector;
    said base being connected to said isolation resistances, said emitter being connected to each said ground point, and said collector being connected by an electrical path to a supply of power so that said collector has a collector voltage, said decision indicator operating in response to said collector voltage.

26. A decision simulator as claimed in claim 25 wherein each of said isolation resistances comprises a variable resistor, each said variable resistor being attached to one of said adjustment dials.

27. A personality simulator comprising
three independently adjustable sources of voltage continuously adjustable between a positive voltage and a negative voltage;
three dial means for respectively adjusting each of said voltage sources and for respectively indicating social pressure, personal inclination, and leader pressure relative to a personal decision;
three variable resistances respectively connected to said voltage sources;
three dial means for respectively adjusting each of said variable resistances and for respectively indicating independence from social pressure, selflessness, and compliance with leaders;
a transistor having a base, an emitter, and a collector; and
decision indicator means;
said three variable resistances being connected to said base of said transistor, said emitter of said transistor being connected to ground, and said collector of said transistor being connected to said decision indicator means.

28. A decision simulator as claimed in claim 20 wherein said simulator further comprises means for providing changeable interpretations for each said adjustment dial.

29. A decision simulator as claimed in claim 28 wherein said interpretation means comprises printed overlay sheets providable to a panel near said adjustment dials and said decision indicator so that changeable interpretations are provided for each said adjustment dial and said decision indicator.

30. A decision simulator as claimed in claim 21 wherein
said adjustable sources of electrical voltage are attached to said adjustment dials respectively, said adjustment dials respectively indicating influences on judicial decisionmaking due to a plaintiff, a defendant, and a burden of proof,
the voltage source attached to the plaintiff adjustment dial providing variable voltage of one polarity only,
the voltage source attached to the defendant adjustment dial providing variable voltage of only that polarity opposite to said plaintiff voltage polarity,
and the voltage source attached to the burden of proof adjustment dial providing variable voltage of polarity opposite to the plaintiff voltage polarity when said burden of proof dial indicates plaintiff bears the burden.

31. A decision simulator as claimed in claim 30 wherein
the voltage source attached to the burden of proof adjustment dial also provides variable voltage of polarity opposite to the defendant voltage polarity when said burden of proof dial indicates defendant bears the burden;
and said decision simulator further comprises pressable switch means for obtaining a simulated judicial decision.

32. A decision simulator as claimed in claim 21 wherein
said adjustable sources of electrical voltage are attached each to a respective one of said adjustment dials and each said dial indicates a respective decisional influence; and
said combining means comprises
isolation resistances respectively connected to said voltage sources, at least one of said isolation resistances being variable, each said variable isolation resistance being attached to a respective adjustment dial means for substantially indicating levels of isolation from the respective decisional influence; and
threshold level detector means connected to said isolation resistances,
said decision indicator indicating in response to said threshold level detector means.

33. A decision simulator comprising
a source of voltage continuously adjustable between a positive voltage and a negative voltage;
dial means for adjusting said voltage source and indicating levels of decisional influence;
decision indicator means; and
level detector means responsive to said voltage source and connected to said decision indicator means so that when said voltage source is adjusted to be positive said decision indicator indicates a first decision and when said voltage source is adjusted to be negative said decision indicator indicates a different decision.

34. A decision simulator as claimed in claim 33 wherein said adjustable voltage source comprises a potentiometer connected from a positive terminal of a first battery to a negative terminal of a second battery, said batteries being connected in series and tied to ground, said potentiometer having a wiper;
said level detector means is a transistor having a base connected by a resistance to said wiper, an emitter connected to ground, and a collector connected to said decision indicator means;
and said decision indicator means comprises a lamp connected from said collector to one of said first and second batteries.

* * * * *